United States Patent
Ray et al.

(10) Patent No.: US 10,540,109 B2
(45) Date of Patent: Jan. 21, 2020

(54) SERIALIZING ACCESS TO FAULT TOLERANT MEMORY

(71) Applicant: HEWLETT PACKARD ENTERPRISE DEVELOPMENT LP, Houston, TX (US)

(72) Inventors: Harvey Ray, Frederick, CO (US); Gary Gostin, Plano, TX (US); Derek Alan Sherlock, Fort Collins, CO (US); Gregg B. Lesartre, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/314,710

(22) PCT Filed: Sep. 2, 2014

(86) PCT No.: PCT/US2014/053704
§ 371 (c)(1),
(2) Date: Nov. 29, 2016

(87) PCT Pub. No.: WO2016/036347
PCT Pub. Date: Mar. 10, 2016

(65) Prior Publication Data
US 2017/0185343 A1    Jun. 29, 2017

(51) Int. Cl.
*G06F 12/00*    (2006.01)
*G06F 3/06*    (2006.01)
(Continued)

(52) U.S. Cl.
CPC ......... *G06F 3/0637* (2013.01); *G06F 3/0604* (2013.01); *G06F 3/067* (2013.01);
(Continued)

(58) Field of Classification Search
None
See application file for complete search history.

(56) References Cited

U.S. PATENT DOCUMENTS

| 5,032,744 | A | 7/1991 | Liu |
| 5,243,592 | A | 9/1993 | Perlman et al. |

(Continued)

FOREIGN PATENT DOCUMENTS

| CN | 101576805 A | 11/2009 |
| CN | 102521058 A | 6/2012 |

(Continued)

OTHER PUBLICATIONS

Amiri, K. et al., Highly Concurrent Shared Storage, (Research Paper), Sep. 7, 1999, 25 Pages.

(Continued)

*Primary Examiner* — Brian R Peugh
(74) *Attorney, Agent, or Firm* — Hewlett Packard Enterprise Patent Department

(57) ABSTRACT

According to an example, a lock may be requested by a first redundancy controller from a parity media controller to perform a first sequence that accesses multiple memory modules in a stripe. The lock may be acquired for the stripe so that the first sequence may be performed on the stripe. The lock may then be released from the stripe.

14 Claims, 10 Drawing Sheets

(51) Int. Cl.
*G06F 11/10* (2006.01)
*G06F 9/52* (2006.01)

(52) U.S. Cl.
CPC .......... *G06F 3/0614* (2013.01); *G06F 3/0644* (2013.01); *G06F 3/0683* (2013.01); *G06F 11/108* (2013.01); *G06F 9/52* (2013.01)

(56) References Cited

U.S. PATENT DOCUMENTS

| | | |
|---|---|---|
| 5,327,553 A | 7/1994 | Jewett et al. |
| 5,533,999 A | 7/1996 | Hood et al. |
| 5,546,535 A | 8/1996 | Stallmo et al. |
| 5,555,266 A | 9/1996 | Buchholz et al. |
| 5,633,996 A | 5/1997 | Hayashi et al. |
| 5,633,999 A | 5/1997 | Clowes et al. |
| 5,724,046 A | 3/1998 | Martin et al. |
| 5,905,871 A | 5/1999 | Buskens et al. |
| 6,073,218 A | 6/2000 | DeKoning et al. |
| 6,081,907 A | 6/2000 | Witty et al. |
| 6,092,191 A | 7/2000 | Shimbo et al. |
| 6,141,324 A | 10/2000 | Abbott et al. |
| 6,151,659 A | 11/2000 | Solomon et al. |
| 6,181,704 B1 | 1/2001 | Drottar et al. |
| 6,389,373 B1 | 5/2002 | Ohya |
| 6,457,098 B1 | 9/2002 | Dekoning et al. |
| 6,467,024 B1 | 10/2002 | Bish et al. |
| 6,490,659 B1 | 12/2002 | McKean et al. |
| 6,502,165 B1 | 12/2002 | Kishi et al. |
| 6,510,500 B2 | 1/2003 | Sarkar et al. |
| 6,542,960 B1 | 4/2003 | Wong et al. |
| 6,654,830 B1 | 11/2003 | Taylor et al. |
| 6,735,645 B1 | 5/2004 | Weber et al. |
| 6,826,247 B1 | 11/2004 | Elliott et al. |
| 6,834,326 B1 | 12/2004 | Wang et al. |
| 6,911,864 B2 | 6/2005 | Bakker et al. |
| 6,938,091 B2 | 8/2005 | Das Sharma |
| 6,970,987 B1 | 11/2005 | Ji et al. |
| 7,366,808 B2 | 4/2008 | Kano et al. |
| 7,506,368 B1 | 3/2009 | Kersey et al. |
| 7,738,540 B2 | 6/2010 | Yamasaki et al. |
| 7,839,858 B2 | 11/2010 | Wiemann et al. |
| 7,908,513 B2 | 3/2011 | Ogasawara et al. |
| 7,934,055 B2 | 4/2011 | Flynn et al. |
| 7,996,608 B1 | 8/2011 | Chatterjee et al. |
| 8,005,051 B2 | 8/2011 | Watanabe |
| 8,018,890 B2 | 9/2011 | Venkatachalam et al. |
| 8,054,789 B2 | 11/2011 | Boariu et al. |
| 8,103,869 B2 | 1/2012 | Balandin et al. |
| 8,135,906 B2 | 3/2012 | Wright et al. |
| 8,161,236 B1 | 4/2012 | Noveck et al. |
| 8,169,908 B1 | 5/2012 | Sluiter et al. |
| 8,171,227 B1 | 5/2012 | Goldschmidt et al. |
| 8,332,704 B2 | 12/2012 | Chang et al. |
| 8,341,459 B2 | 12/2012 | Kaushik et al. |
| 8,386,834 B1 | 2/2013 | Goel et al. |
| 8,386,838 B1 | 2/2013 | Byan et al. |
| 8,462,690 B2 | 6/2013 | Chang et al. |
| 8,483,116 B2 | 7/2013 | Chang et al. |
| 8,605,643 B2 | 12/2013 | Chang et al. |
| 8,619,606 B2 | 12/2013 | Nagaraja |
| 8,621,147 B2 | 12/2013 | Galloway et al. |
| 8,667,322 B1 | 3/2014 | Chatterjee et al. |
| 8,700,570 B1 | 4/2014 | Marathe et al. |
| 8,793,449 B1 | 7/2014 | Kimmel |
| 8,812,901 B2 | 8/2014 | Sheffield, Jr. |
| 9,128,948 B1 | 9/2015 | Raorane |
| 9,166,541 B2 | 10/2015 | Funato et al. |
| 9,298,549 B2* | 3/2016 | Camp ................. G06F 11/1076 |
| 9,621,934 B2 | 4/2017 | Seastrom et al. |
| 2001/0002480 A1 | 5/2001 | Dekoning et al. |
| 2002/0162076 A1 | 10/2002 | Talagala et al. |
| 2003/0037071 A1 | 2/2003 | Harris et al. |
| 2003/0126315 A1 | 7/2003 | Tan et al. |
| 2004/0133573 A1 | 7/2004 | Miloushev et al. |
| 2004/0233078 A1 | 11/2004 | Takehara |
| 2005/0027951 A1 | 2/2005 | Piccirillo et al. |
| 2005/0044162 A1 | 2/2005 | Liang et al. |
| 2005/0120267 A1 | 6/2005 | Burton et al. |
| 2005/0144406 A1 | 6/2005 | Chong, Jr. |
| 2005/0157697 A1 | 7/2005 | Lee et al. |
| 2006/0112304 A1 | 5/2006 | Subramanian et al. |
| 2006/0129559 A1 | 6/2006 | Sankaran et al. |
| 2006/0264202 A1 | 11/2006 | Hagmeier et al. |
| 2007/0028041 A1 | 2/2007 | Hallyal et al. |
| 2007/0140692 A1 | 6/2007 | Decusatis et al. |
| 2007/0168693 A1 | 7/2007 | Pittman |
| 2007/0174657 A1 | 7/2007 | Ahmadian et al. |
| 2008/0060055 A1 | 3/2008 | Lau |
| 2008/0137669 A1 | 6/2008 | Balandina et al. |
| 2008/0201616 A1 | 8/2008 | Ashmore |
| 2008/0281876 A1 | 11/2008 | Mimatsu |
| 2009/0080432 A1 | 3/2009 | Kolakeri et al. |
| 2009/0259882 A1 | 10/2009 | Shellhamer |
| 2009/0313313 A1 | 12/2009 | Yokokawa et al. |
| 2010/0107003 A1 | 4/2010 | Kawaguchi |
| 2010/0114889 A1 | 5/2010 | Rabii et al. |
| 2011/0109348 A1 | 5/2011 | Chen et al. |
| 2011/0173350 A1 | 7/2011 | Coronado et al. |
| 2011/0208994 A1 | 8/2011 | Chambliss et al. |
| 2011/0213928 A1 | 9/2011 | Grube et al. |
| 2011/0246819 A1 | 10/2011 | Callaway et al. |
| 2011/0314218 A1 | 12/2011 | Bert |
| 2012/0032718 A1 | 2/2012 | Chan et al. |
| 2012/0059800 A1 | 3/2012 | Guo |
| 2012/0096329 A1 | 4/2012 | Taranta, II |
| 2012/0137098 A1 | 5/2012 | Wang et al. |
| 2012/0166699 A1 | 6/2012 | Kumar et al. |
| 2012/0166909 A1 | 6/2012 | Schmisseur et al. |
| 2012/0201289 A1 | 8/2012 | Abdalla et al. |
| 2012/0204032 A1 | 8/2012 | Wilkins et al. |
| 2012/0213055 A1 | 8/2012 | Bajpai et al. |
| 2012/0297272 A1 | 11/2012 | Bakke et al. |
| 2012/0311255 A1 | 12/2012 | Chambliss |
| 2013/0060948 A1 | 3/2013 | Ulrich et al. |
| 2013/0128721 A1 | 5/2013 | Decusatis et al. |
| 2013/0128884 A1 | 5/2013 | Decusatis et al. |
| 2013/0138759 A1 | 5/2013 | Chen et al. |
| 2013/0148702 A1 | 6/2013 | Payne |
| 2013/0227216 A1 | 8/2013 | Cheng et al. |
| 2013/0246597 A1 | 9/2013 | Iizawa et al. |
| 2013/0297976 A1 | 11/2013 | McMillen |
| 2013/0311822 A1 | 11/2013 | Kotzur et al. |
| 2013/0312082 A1 | 11/2013 | Izu et al. |
| 2014/0067984 A1 | 3/2014 | Danilak |
| 2014/0095865 A1 | 4/2014 | Yerra et al. |
| 2014/0115232 A1 | 4/2014 | Goss et al. |
| 2014/0136799 A1 | 5/2014 | Fortin |
| 2014/0269731 A1 | 9/2014 | Decusatis et al. |
| 2014/0281688 A1 | 9/2014 | Tiwari et al. |
| 2014/0304469 A1 | 10/2014 | Wu |
| 2014/0331297 A1 | 11/2014 | Innes et al. |
| 2015/0012699 A1 | 1/2015 | Rizzo et al. |
| 2015/0095596 A1 | 4/2015 | Yang |
| 2015/0146614 A1 | 5/2015 | Yu et al. |
| 2015/0199244 A1 | 7/2015 | Venkatachalam et al. |
| 2015/0288752 A1 | 10/2015 | Voigt |
| 2016/0034186 A1* | 2/2016 | Weiner ..................... G06F 3/061 710/74 |
| 2016/0170833 A1 | 6/2016 | Segura et al. |
| 2016/0196182 A1* | 7/2016 | Camp ................. G06F 11/1076 714/6.24 |
| 2016/0226508 A1 | 8/2016 | Kurooka et al. |
| 2017/0253269 A1 | 9/2017 | Kanekawa et al. |
| 2017/0302409 A1 | 10/2017 | Sherlock |
| 2017/0346742 A1 | 11/2017 | Shahar et al. |

FOREIGN PATENT DOCUMENTS

| | | |
|---|---|---|
| CN | 104333358 A | 2/2015 |
| EP | 1347369 B1 | 11/2012 |
| IN | 1546/MUM/2013 | 3/2015 |
| TW | 201346530 A | 11/2013 |

(56) References Cited

FOREIGN PATENT DOCUMENTS

WO      WO-02091689 A1    11/2002
WO      2014/120136 A1    8/2014

OTHER PUBLICATIONS

International Search Report and Written Opinion; PCT/US2014/053704; dated May 15, 2015; 13 pages.
Almeida, P. S., et al; Scalable Eventually Consistent Counters Over Unreliable Networks; Jul. 12, 2013; 32 Pages.
International Search Report and Written Opinion; PCT/US2015/013898; dated Oct. 8, 2015; 11 pages.
Razavi, B. et al., "Design Techniques for High-Speed, High-Resolution Comparators," (Research Paper), IEEE Journal of Solid-State Circuits 27.12, Dec. 12, 1992, pp. 1916-1926, http://www.seas.ucla.edu/brweb/papers/Journals/R%26WDec92_2.pdf.
Xingyuan, T. et al., "An Offset Cancellation Technique in a Switched-Capacitor Comparator for SAR ADCs"; (Research Paper), Journal of Semiconductors 33.1, Jan. 2012, 5 pages, http://www.jos.ac.cn/bdtxbcn/ch/reader/create_pdf.aspx?file_no=11072501.
Mao, Y. et al., A New Parity-based Migration Method to Expand Raid-5, (Research Paper), Nov. 4, 2013, 11 Pages.
Kimura et al., "A 28 Gb/s 560 mW Multi-Standard SerDes With Single-Stage Analog Front-End and 14-Tap Decision Feedback Equalizer in 28 nm CMOS," IEEE Journal of Solid-State Circuits, vol. 49, No. 12, Dec. 2014, pp. 3091-3103.
International Searching Authority, The International Serach Report 6 and the Written Opinion, dated Feb. 26, 2015, 10 Pages.
Li, M. et al: Toward I/O-Efficient Protection Against Silent Data Corruptions in RAID Arrays, (Research Paper); Jun. 2-6, 2014; 12 Pages.
International Searching Authority, The International Search Report and the Written Opinion, dated Feb. 26, 2015, 10 Pages.
International Search Report and Written Opinion; PCT/US2015/023708; dated Apr. 22, 2016; 13 pages.
International Search Report and Written Opinion; PCT/US2015/013921; dated Oct. 28, 2015; 12 pages.
International Search Report and Written Opinion received for PCT Patent Application No. PCT/US2015/023708, dated Apr. 22, 2016, 11 pages.
International Search Report and Written Opinion received for PCT Patent Application No. PCT/US2015/013921, dated Oct. 28, 2015, 10 pages.
International Search Report and Written Opinion received for PCT Patent Application No. PCT/US2015/013898, dated Oct. 8, 2015, 9 pages.
International Search Report and Written Opinion received for PCT Patent Application No. PCT/US2015/013817, dated Oct. 29, 2015, 11 pages.
International Preliminary Report on Patentability received for PCT Patent Application No. PCT/US2015/023708, dated Oct. 12, 2017, 10 pages.
International Preliminary Report on Patentability received for PCT Patent Application No. PCT/US2015/013921, dated Aug. 10, 2017, 9 pages.
International Preliminary Report on Patentability received for PCT Patent Application No. PCT/US2015/013898, dated Aug. 10, 2017, 8 pages.
International Preliminary Report on Patentability received for PCT Patent Application No. PCT/US2015/013817, dated Aug. 10, 2017, 9 pages.
International Preliminary Report on Patentability received for PCT Patent Application No. PCT/US2014/053704, dated Mar. 16, 2017, 10 pages.
International Preliminary Report on Patentability received for PCT Patent Application No. PCT/US2014/049193, dated Feb. 9, 2017, 7 pages.
EMC2; High Availability and Data Protection with EMC Isilon Scale-out NAS, (Research Paper); Nov. 2013; 36 Pages.
Do I need a second RAID controller for fault-tolerance ?, (Research Paper); Aug. 22, 2010; 2 Pages; http://serverfault.com/questions/303869/do-i-need-a-second-raid-controller-for-fault-tolerance.
Kang, Y. et al., "Fault-Tolerant Flow Control in On-Chip Networks," (Research Paper), Proceedings for IEEE, May 3-6, 2010, 8 pages, available at http://citeseerx.ist.psu.edu/viewdoc/download?doi=10.1.1.228.7865&rep=rep1&type=pdf.
International Search Report and Written Opinion received for PCT Patent Application No. PCT/US2014/062196, dated Jun. 30, 2015, 13 pages.
International Preliminary Report on Patentability received for PCT Patent Application No. PCT/US2014/062196, dated May 4, 2017, 12 pages.

* cited by examiner

SERIALIZING ACCESS TO FAULT TOLERANT MEMORY

BACKGROUND

Current data storage devices such as volatile and non-volatile memory often include a fault tolerance mechanism to ensure that data is not lost in the event of a device error or failure. An example of a fault tolerance mechanism provided to current data storage devices is a redundant array of independent disks (RAID), RAID is a storage technology that controls multiple memory modules and provides fault tolerance by storing data with redundancy. RAID technology may store data with redundancy in a variety of ways. Examples of redundant data storage include duplicating data and storing the data in multiple memory modules and adding parity to store calculated error recovery bits. The multiple memory modules, which may include the data and associated parity, are often accessed concurrently by multiple redundancy controllers.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1A:
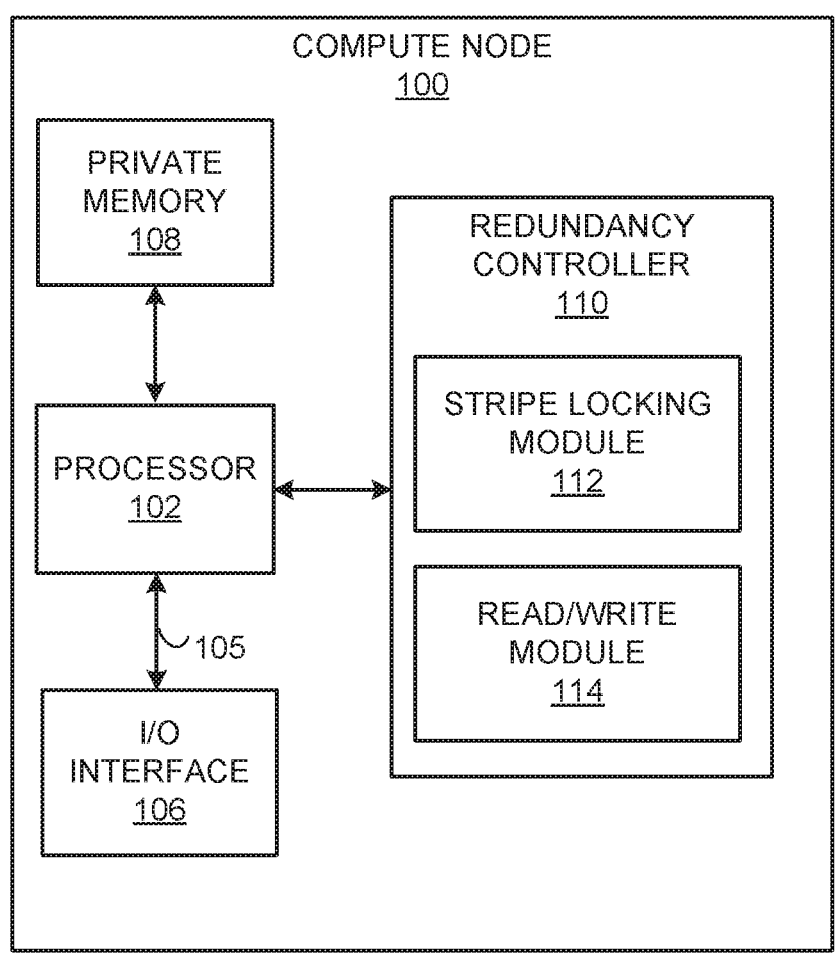
FIG. 1A shows a simplified block diagram of a compute node to serialize concurrent accesses to fault tolerant memory, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

In addition, the following terms will be used throughout the remainder of the present disclosure:

Command: A transaction sent from a processor, I/O device or other source to a redundancy controller.

Primitive: A single request issued by a redundancy controller to a media controller, along with its response.

Sequence: An ordered set of primitives issued by a redundancy controller to one or more media controllers to execute a command received from a processor, I/O device or other source.

Locked sequence: A sequence that requires atomic access to multiple media controllers.

Cacheline: The unit of data that may be read from or written to a media controller by a redundancy controller. This includes any type or size of data, such as a disk sector, an SSD block, a RAID block or a processor cacheline.

Stripe: A set of one or more data cachelines and associated redundancy information stored in one or more parity cachelines that is distributed across multiple memory modules.

Disclosed herein are examples of methods to serialize concurrent accesses by multiple redundancy controllers to fault tolerant memory. Fault tolerant memory, for instance, may include memory using redundant array of independent disks (RAID) technology. The disclosed examples disclose stripe locking methods to eliminate computational hazards (e.g., race conditions) by sequentially executing, without overlap, those sequences of access primitives to the multiple fault-tolerant memory modules that require atomic access for correct operation.

According to an example, a lock may be requested, by a first redundancy controller, from a parity media controller. The lock may be requested to perform a first locked sequence that accesses multiple memory modules in a stripe. A stripe may include data stored in at least one data memory module and parity stored in at least one parity memory module. In other words, a stripe may include cachelines distributed across multiple modules which contain redundant information and must be atomically accessed to maintain the consistency of the redundant information, as discussed further below. In all examples presented here, a one-cacheline RAID block size is assumed, and all memory access primitives are assumed to operate at a one-cacheline granularity. It will be readily apparent however, that the present disclosure may be practiced without limitation to this specific RAID block size. A locked sequence may include any sequence of primitives that requires atomic access to multiple media controllers for correct operation. This may include a write sequence or an error correction sequence.

The lock for a stripe, for example, may be acquired by a redundancy controller so that a locked sequence may be performed on the stripe. To acquire the lock, the redundancy controller issues a lock request message to the media controller that stores the parity cacheline for the stripe. The media controller consults a stripe-specific lock flag associated with the parity cacheline to determine whether the stripe is already locked or unlocked. In response to the stripe already being locked, the lock request is added to a conflict queue. However, in response to the stripe being unlocked, the lock may be granted by the media controller to the requesting redundancy controller, by issuing a lock completion response to the redundancy controller. The lock request message and subsequent lock completion message form a lock primitive. A lock primitive is the first primitive of any locked sequence. The lock provides the first redundancy controller exclusive access to the stripe, which prevents a second redundancy controller from concurrently performing a second locked sequence.

The lock for the stripe, for example, may then be released after the first redundancy controller completes the first sequence that accesses multiple memory modules in the stripe. To release the lock, the redundancy controller issues an unlock request message to the media controller that stores the parity cacheline for the locked stripe. The media controller in turn releases the lock by clearing the lock flag, and then sending an unlock completion message to the redundancy controller. The unlock request message and subsequent unlock completion message form an unlock primitive. An unlock primitive is the last primitive of any locked sequence. Additionally, the lock may be terminated for the stripe after the media controller determines that the duration of the lock has exceeded a predetermined time threshold. Termination of a lock under these conditions is termed lock breaking. Unlike released locks, broken locks are not associated with any unlock primitive. When a lock is broken, the parity cacheline is poisoned (flagged as invalid). The affected stripe may subsequently be reconstructed by a redundancy controller using an error correction sequence.

Memory technologies such as fast, non-volatile memory enable high performance compute and storage servers. These servers require fault tolerance (e.g., using RAID) to be a viable solution. Next generation high performance compute and storage servers may use fast direct-mapped load/store model storage in lieu of slower Direct Memory Access (DMA) on PCI buses to mechanical and solid state drives. Direct mapped storage has low latency requirements because processor load/store accesses directly target this nonvolatile memory. Computer systems may consist of pools of compute servers and pools of shared non-volatile memory. Each server in the pool may concurrently access the fault tolerant memory. Accordingly, RAID write sequences and error correction sequences require atomic access to two or more of the memory modules. On a scalable fabric or bus, concurrent accesses to multiple memory modules are unordered and not inherently atomic. Consequently, data and parity may become inconsistent due to concurrent accesses to the stripe.

In other words, some sequences of primitives issued by a redundancy controller need to be executed atomically to avoid race conditions that could result in parity inconsistency. For example, a processor write command may result in a locked sequence consisting of lock, read, write and unlock primitives issued by a redundancy controller targeting data and parity cachelines on different media controllers. Similar traffic sequences may reach a media controller from multiple redundancy controllers (e.g., acting on behalf of multiple servers). To ensure atomicity of each sequence requiring it, this invention implements locking and unlocking primitives, used to serialize locked sequences of memory access primitives arriving at media controllers from multiple redundancy controllers.

Accordingly, the disclosed examples enable concurrent access to memory while ensuring parity-data consistency. When applied within the context of a direct-mapped load/store access model, a hardware-implemented redundancy controller can perform the required read and write sequences within a time-constraint compatible with an outstanding read or write command issued by a processor. Generally speaking the disclosed examples provide fault tolerance for high-performance and low-latency direct mapped storage. As such, a pool of memory/storage may be shared among multiple redundancy controllers acting on behalf of multiple servers that are attached to a common fabric or bus, while maintaining parity-data consistency. Moreover, the disclosed examples enable data sharing or aggregation between independent redundancy controllers, and allow memory to be hot-swapped in running systems without operating system (OS) intervention. Further, the disclosed examples do not have a single point of failure in systems with multiple redundancy controllers and media controllers.

With reference to FIG. 1A, there is shown a block diagram of a compute node (e.g., computing device, input/output (I/O) server node) 100 to serialize concurrent accesses by multiple redundancy controllers to fault tolerant memory according to an example of the present disclosure. It should be understood that the compute node 100 may include additional components and that one or more of the components described herein may be removed and/or modified without departing from a scope of the compute node 100.

For example, the compute node 100 may include a processor 102, an input/output interface 106, a private memory 108, and a redundancy controller 110 (e.g., a RAID controller). In one example, the compute node 100 is a server but other types of compute nodes may be used. The compute node 100 may be a node of a distributed data storage system. For example, the compute node 100 may be part of a cluster of nodes that services queries and provides data storage for multiple users or systems, and the nodes may communicate with each other to service queries and store data. The cluster of nodes may provide data redundancy to prevent data loss and minimize down time in case of a node failure.

The processor 102 may be a microprocessor, a microcontroller, an application specific integrated circuit (ASIC), field programmable gate array (FPGA), or other type of circuit to perform various processing functions. The private memory 108 may include volatile dynamic random access memory (DRAM) with or without battery backup, non-volatile phase change random access memory (PCRAM), spin transfer torque-magnetoresistive random access memory (STT-MRAM), resistive random access memory (reRAM), memristor, FLASH, or other types of memory devices. For example, the memory may be solid state, persistent, dense, fast memory. Fast memory can be memory having an access time similar to DRAM memory. The I/O interface 106 may include a hardware and/or a software interface. The I/O interface 106 may be a network interface connected to a network, such as the Internet, a local area network, etc. The compute node 100 may receive data and user-input through the I/O interface 106. Where examples herein describe redundancy controller behavior occurring in response to read or write commands issued by the processor 102, this should not be taken restrictively. The examples are also applicable if such read or write commands are issued by an I/O device via interface 105.

The components of computing node 100 may be coupled by an interconnect fabric 105 (FIG. 1B), where the fabric 105 may be a communication system that transfers data between the various components of the computing device 100. In examples, the fabric may be a Peripheral Component Interconnect (PCI), Industry Standard Architecture (ISA), PCI-Express, HyperTransport®, NuBus, a proprietary bus, and the like. Alternatively, the processor 102 may use multiple different fabrics to communicate with the various components, such as PCIe for I/O, DDR3 for memory, and QPI for the redundancy controller.

The redundancy controller 110, for example, may generate certain sequences of primitives independently, not directly resulting from processor commands. These include sequences used for scrubbing, initializing, migrating, or error-correcting memory. The redundancy controller 110 is depicted as including a stripe locking module 112 and a read/write module 114. Blocks 112 and 114 are shown to illustrate the functionality of the redundancy controller 110. However, the functionality is implemented by hardware. The modules 112 and 114 for example are hardware of the redundancy controller 110, and the modules 112 and 114 may not be machine readable instructions executed by a general purpose computer. The stripe locking module 112, for example, may acquire and release a lock for a given stripe in memory. The read/write module 114, for example, may process read or write sequences to the memory.

Figure 1B:
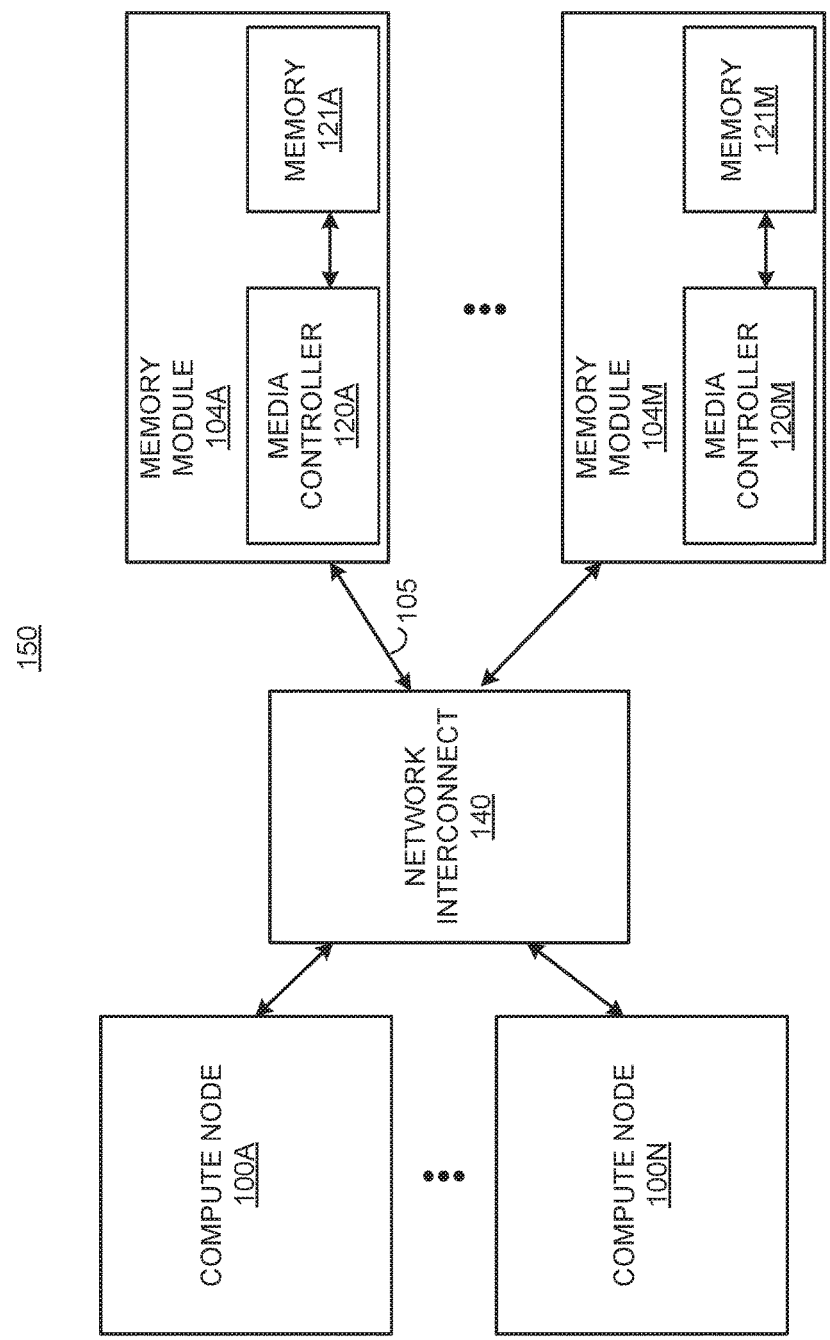
FIG. 1B shows a simplified block diagram of a fault tolerant system to serialize concurrent accesses by multiple redundancy controllers to fault tolerant memory according to an example of the present disclosure.

With reference to FIG. 1B, there is shown a block diagram of a fault tolerant system 150 to serialize concurrent accesses by multiple redundancy controllers to fault tolerant memory according to an example of the present disclosure. It should be understood that the system 150 may include additional components and that one or more of the components described herein may be removed and/or modified without departing from a scope of the system 150. The system 150 may include multiple compute nodes 100A-N (where the number of compute nodes is greater than or equal to 1), a network interconnect module 140, and memory modules 104A-M.

The multiple compute nodes 100A-N may be coupled to the memory modules 104A-M by the network interconnect module 140. The memory modules 104A-M may include media controllers 120A-M and memories 121A-M. Each media controller, for instance, may communicate with its associated memory and control access to the memory by the processor 102. The media controllers 120A-M provide access to regions of memory. The regions of memory are accessed by multiple redundancy controllers in the compute nodes 100A-N using access primitives such as read, write, lock, unlock, etc. In order to support aggregation or sharing of memory, media controllers 120A-M may be accessed by multiple redundancy controllers (e.g., acting on behalf of multiple servers). Thus, there is a many-to-many relationship between redundancy controllers and media controllers. The memory 121A-M may include volatile dynamic random access memory (DRAM) with battery backup, non-volatile phase change random access memory (PCRAM), spin transfer torque-magnetoresistive random access memory (STT-MRAM), resistive random access memory (reRAM), memristor, FLASH, or other types of memory devices. For example, the memory may be solid state, persistent, dense, fast memory. Fast memory can be memory having an access time similar to DRAM memory.

As described in the disclosed examples, the redundancy controller 110 may maintain fault tolerance across the memory modules 104A-M. The redundancy controller 110 may receive read or write commands from one or more processors 102, I/O devices, or other sources. In response to these, it generates sequences of primitive accesses to multiple media controllers 120A-M. The redundancy controller 110 may also generate certain sequences of primitives independently, not directly resulting from processor commands. These include sequences used for scrubbing, initializing, migrating, or error-correcting memory.

Stripe locks acquired and released by the stripe locking module 112 guarantee atomicity for locked sequences. Accordingly, the term "stripe lock" has been used throughout the text to describe these locks. For any given stripe, actual manipulation of the locks, including request queueing, lock ownership tracking, granting, releasing, and breaking, may be managed by the media controller that stores the parity cacheline for the stripe. Locking and unlocking is coordinated between the redundancy controllers and the relevant media controllers using lock and unlock primitives, which include lock and unlock request and completion messages. Media controllers 120A-M implement lock semantics on a per-cacheline address basis. Cachelines that represent stripe parity storage receive lock and unlock primitives from redundancy controllers, while those that represent data storage do not receive lock and unlock primitives. By associating locks with cacheline addresses, media controllers 120A-M may participate in the locking protocol without requiring explicit knowledge about the stripe layouts implemented by the redundancy controllers. Where the term "stripe lock" is used herein in the context of media controller operation, this should not be taken to imply any knowledge by the media controller of stripe layout. Media controllers 120A-M may distinguish locks from each other by address only, without regard to the stripe layout.

Figure 2A:
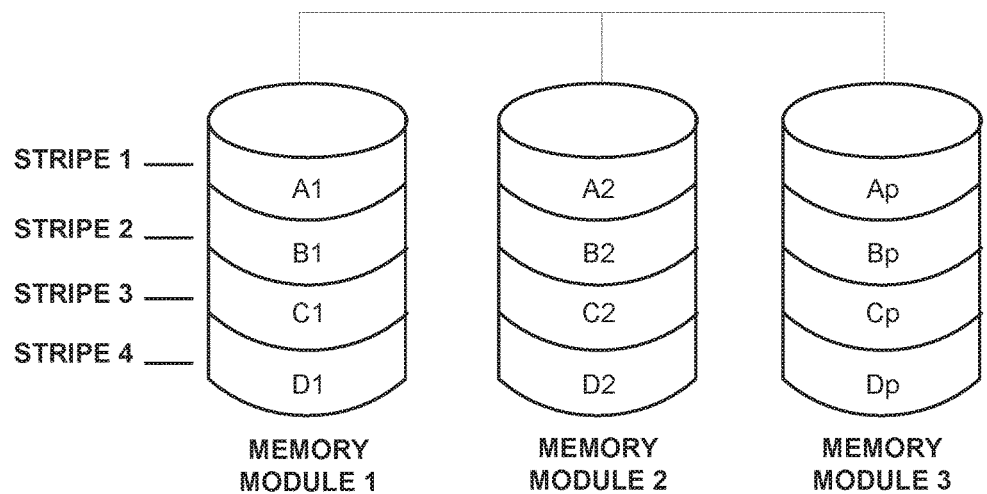
FIG. 2A shows striping across multiple memory modules in a fault tolerant scheme, according to an example of the present disclosure.

Referring to FIG. 2A, the fault tolerant scheme may use memory associated with multiple memory modules (memory module 1, memory module 2, and memory module 3) to store RAID blocks A1-Dp. According to this example, each RAID block may include a single cacheline. A cacheline is the largest unit of data that can be atomically read or written to a memory module. A cacheline could be of any size used by processors, such as 64 bytes. The use of a single cacheline RAID block size should not be taken restrictively. Cachelines A1, A2, B1, B2, C1, C2, D1, and D2 represent data cachelines that are distributed across memory module 1 and memory module 2. Cachelines Ap, Bp, Cp, and Dp represent parity cachelines that are stored in memory module 3. The parity cachelines provide redundancy for the data cachelines. A stripe may include a combination of data cachelines from at least one memory module and parity cachelines from at least one other memory module. In other words, a stripe may include memory blocks distributed across multiple modules which contain redundant information, and must be atomically accessed to maintain the consistency of the redundant information. For example, one stripe may include cachelines A1, A2, and Ap (stripe 1), another stripe may include cachelines B1, B2, and Bp (stripe 2), another stripe may include cachelines C1, C2, and Cp (stripe 3), and another stripe may include cachelines D1, D2, and Dp (stripe 4). The data cachelines in a stripe may or may not be sequential in the address space of the processor. A RAID memory group may include stripes 1-4. The example in FIG. 2A represents a RAID-4 configuration, where all parity cachelines are stored on a single memory module. Other RAID configurations, such as RAID-1 where the parity cachelines are mirrors of the data cachelines, and RAID-5 where parity cachelines distributed across all memory modules, are also covered by the present invention.

According to this example, if memory module 1 fails, the data cachelines from memory module 2 may be combined with the corresponding-stripe parity cachelines from memory module 3 (using the Boolean XOR function) to reconstruct the missing cachelines. For instance, if memory module 1 fails, then stripe 1 may be reconstructed by performing an XOR function on data cacheline A2 and parity cacheline Ap to determine data cacheline A1. In addition, the other stripes may be reconstructed in a similar manner using the fault tolerant scheme of this example. In general, a cacheline on a single failed memory module may be reconstructed by XORing the corresponding-stripe cachelines on all of the surviving memory modules.

Figure 2B:
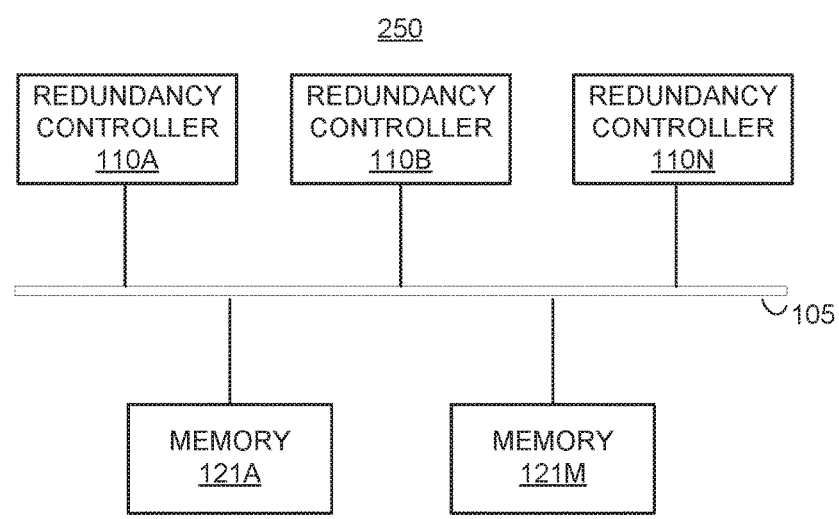
FIG. 2B shows a storage subsystem to serialize concurrent accesses to fault tolerant memory, according to an example of the present disclosure.

With reference to FIG. 2B, there is shown storage subsystem 250 to serialize conflicting concurrent accesses by multiple servers to fault tolerant memory according to an example of the present disclosure. The storage subsystem 250 may include multiple redundancy controllers 110A-N that each attempt to access memory 121A-M. Generally speaking, the multiple redundancy controllers 110A-N need to be configured to safely co-exist without creating data/parity consistency hazards. The methods disclosed below in FIGS. 3-9 describe examples of methods that provide locked access to stripes in memory 121A-M in order to serialize concurrent accesses by the multiple redundancy controllers 110A-N in cases where this is required to avoid such hazards.

Figure 3:
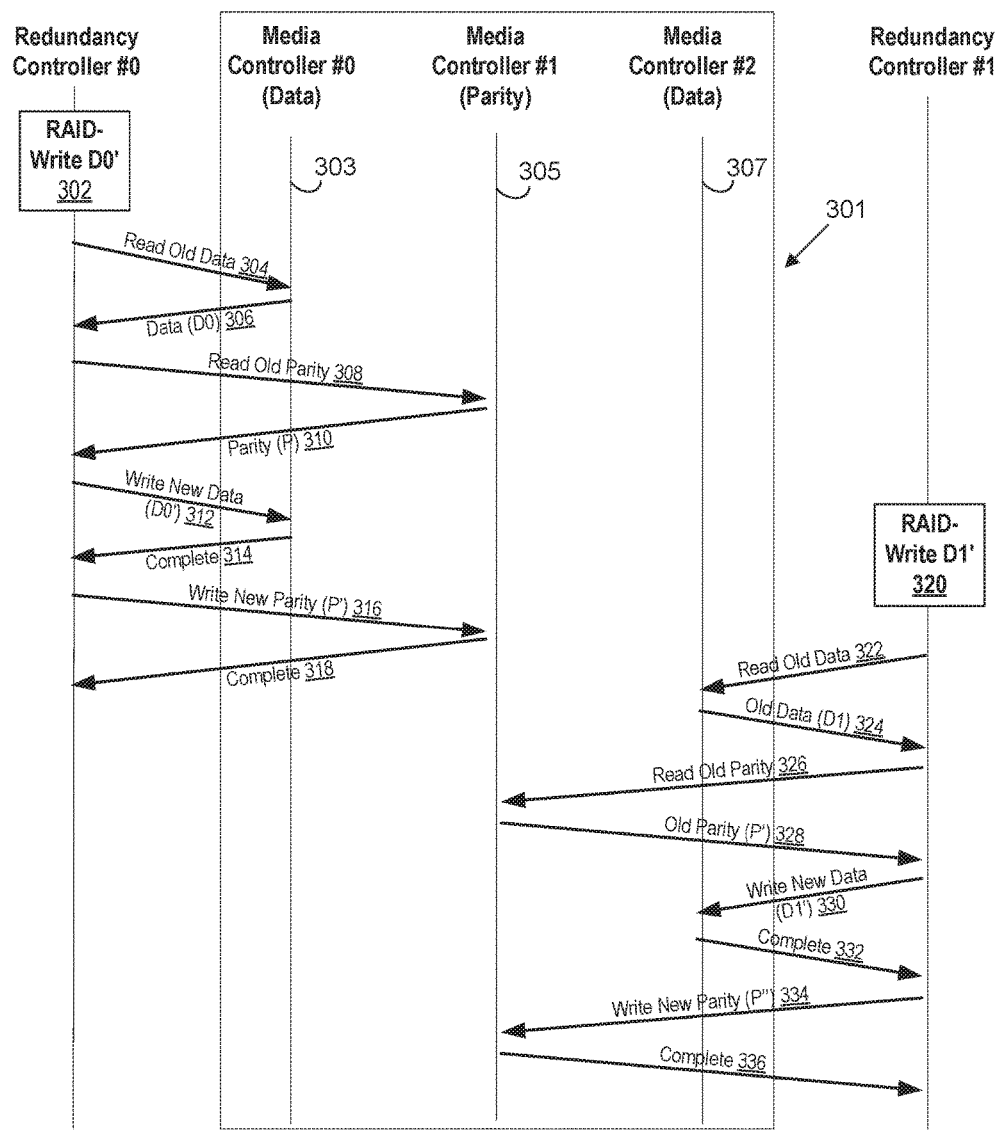
FIG. 3 shows a bounce diagram of serial RAID write sequences by multiple redundancy controllers to multiple memory modules.

FIG. 3 shows a bounce diagram of RAID write sequences by two redundancy controllers, e.g., representing two independent servers, writing to multiple memory modules. In this example, the parity remains consistent with the data because the two write sequences are serialized, rather than concurrent.

Two redundancy controllers (redundancy controller #0 of a first server and redundancy controller #1 of a second server) and three media controllers are depicted in FIG. 3. Redundancy controller #0 and redundancy controller #1 are writing to a stripe 301 that includes data cachelines stored in the first and second memory modules 303, 307 and a parity cacheline stored in the third memory module 305.

In block 302, the redundancy controller #0 issues a sequence to write data D0' to the first data memory module 303 in stripe 301. To perform the write sequence 302, the redundancy controller #0 may perform the following primitives. As shown in arcs 304 and 306, the redundancy controller #0 reads the old data from the first data memory module 303 and receives the old data D0 from the media controller #0. The redundancy controller #0 then reads the old parity from the parity memory module 305 and receives the old parity P from the media controller #1, as shown in arcs 308 and 310. At this point, the redundancy controller #0 writes the new data D0' to the first data memory module 303 and in return receives a completion message from the media controller #0, as shown in arcs 312 and 314. Next the redundancy controller #0 calculates the new parity P' as described below. Finally, the redundancy controller #0 writes the new parity P' to the parity memory module 305 and in return receives a completion message from the media controller #1, as shown in arcs 316 and 318.

After the write sequence 302 is completed by the redundancy controller #0, the redundancy controller #1 issues a sequence to write data D1' to the second memory module 307 in stripe 301, as shown in block 320. To perform the write sequence 320, the redundancy controller #1 may perform the following primitives. As shown in arcs 322 and 324, the redundancy controller #1 reads the old data from the second data memory module 307 and receives the old data D1 from the media controller #2. The redundancy controller #1 then reads the old parity from the parity memory module 305 and receives the old parity P', which was written in arc 316 above, from the media controller #1, as shown in arcs 326 and 328. At this point, the redundancy controller #1 writes the new data D1' to the second data memory module 307 and in return receives a completion message from the media controller #2, as shown in arcs 330 and 332. Next the redundancy controller #1 calculates the new parity P'''. Finally, the redundancy controller #1 writes the new parity P''' to the parity memory module 305 and in return receives a completion message from the media controller #1, as shown in arcs 334 and 336.

The parity in this example may be calculated as follows, where ^ indicates an XOR operation:

$$P = D0 \char`\^ D1 \tag{1}$$

$$P' = D0' \char`\^ D1 \text{ (after write } D0'\text{)} \tag{2}$$

$$P''' = D0' \char`\^ D1' \text{ (after write } D1'\text{)} \tag{3}$$

The redundancy controller #0 computes the new parity P' in arc 316 as (4) P'=D0 ^ D0'^ P, Equation (1) may be rewritten as (5) D1=D0 ^ P and substituted into equation (4) to arrive at (6) P'=D0'^ D1, which matches equation (2). Additionally, redundancy controller #1 computes the new parity P''' as (7) P'''=D1 ^ D1' ^ P'. Equation 2 can be rewritten as (8) D0'=P' ^ D1 and substituted into equation 7 to arrive at (9) P'''=D0'^ D1', which matches equation (3). Therefore, the parity is consistent with the data after the two consecutive writes in the example of FIG. 3.

Figure 4:
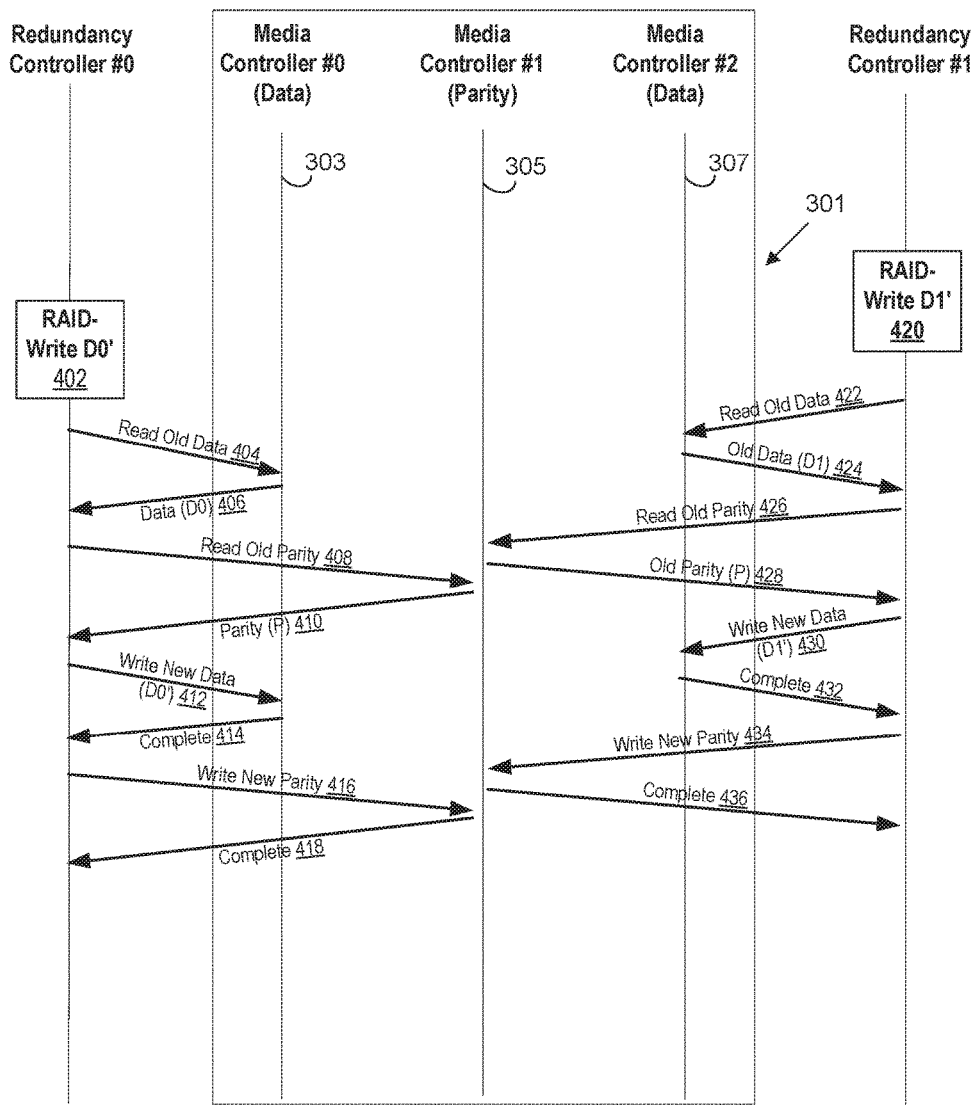
FIG. 4 shows a bounce diagram of a hazard created by concurrent RAID write sequences by multiple redundancy controllers to multiple memory modules.

FIG. 4 shows a bounce diagram of a hazard created by concurrent RAID write sequences by multiple redundancy controllers to multiple memory modules. In this example, the resulting parity is inconsistent with the data because the two writes are concurrent, which leads to a hazardous race condition.

In block 402, the redundancy controller #0 issues a sequence to write data D0' to the first data memory module 303 in stripe 301. To perform the write sequence 402, the redundancy controller #0 may perform the following primitives. As shown in arcs 404 and 406, the redundancy controller #0 reads the old data from the first data memory module 303 and receives the old data D0 from the media controller #0. The redundancy controller #0 then reads the old parity from the parity memory module 305 and receives the old parity P from the media controller #1, as shown in arcs 408 and 410. At this point, the redundancy controller #0 writes the new data D0' to the first data memory module 303 and in return receives a completion message from the media controller #0, as shown in arcs 412 and 414. Next the redundancy controller #0 calculates a new parity. Finally, the redundancy controller #0 writes the new parity to the parity memory module 305 and in return receives a completion message from the media controller #1, as shown in arcs 416 and 418.

In this example, however, the redundancy controller #1 issues a sequence to write data D1' to the second data memory module 307 in stripe 301 concurrently with the write sequence 402, as shown in block 420. To perform the write sequence 420, the redundancy controller #1 may perform the following primitives. As shown in arcs 422 and 424, the redundancy controller #1 reads the old data from the second data memory module 307 and receives the old data D1 from the media controller #2. The redundancy controller #1 then reads the old parity from the parity memory module 305 and receives the old parity P, which is the same parity received by redundancy controller #0 in arc 410 above, from the media controller #1, as shown in arcs 426 and 428. At this point, the redundancy controller #1 writes the new data D1 to the second data memory module 307 and in return receives a completion message from the media controller #2, as shown in arcs 430 and 432. Next the redundancy controller #1 calculates a new parity. Finally, the redundancy controller #1 writes the new parity to the parity memory module 305 and in return receives a completion message from the media controller #1, as shown in arcs 434 and 436.

The parity in this example may be calculated as:

$$P = D0 \char`\^ D1. \tag{1}$$

After the two concurrent writes 402 by the redundancy controller #0 and 420 by the redundancy controller #1, the expected parity is:

$$P'' = D0'\char`\^ D1'. \tag{2}$$

However, after the two concurrent writes 402 and 420, the final parity (P_final) is incorrect because the final write is by redundancy controller #0, which writes (3) P_final=D0 ^ D0'^ P. Equation (1) may be rewritten as (4) D1=D0 ^ P and substituted into equation (3) to arrive at (5) P_final=D0'^ D1, which does not match the expected parity shown in equation (2). Therefore, it is hazardous to allow these write sequences 402, 420 to occur concurrently. In other words, since both redundancy controllers read and wrote to the parity memory module 305 concurrently, a race condition occurred and the parity was left inconsistent with respect to the data.

FIGS. 5-9 respectively depict diagrams of methods 500-900 for serializing concurrent accesses to fault tolerant memory by multiple redundancy controllers according to examples of the present disclosure. It should be apparent to those of ordinary skill in the art that the methods 500-900 represent generalized illustrations and that other sequences may be added or existing sequences may be removed, modified or rearranged without departing from the scopes of the methods 500-900.

Figure 5:
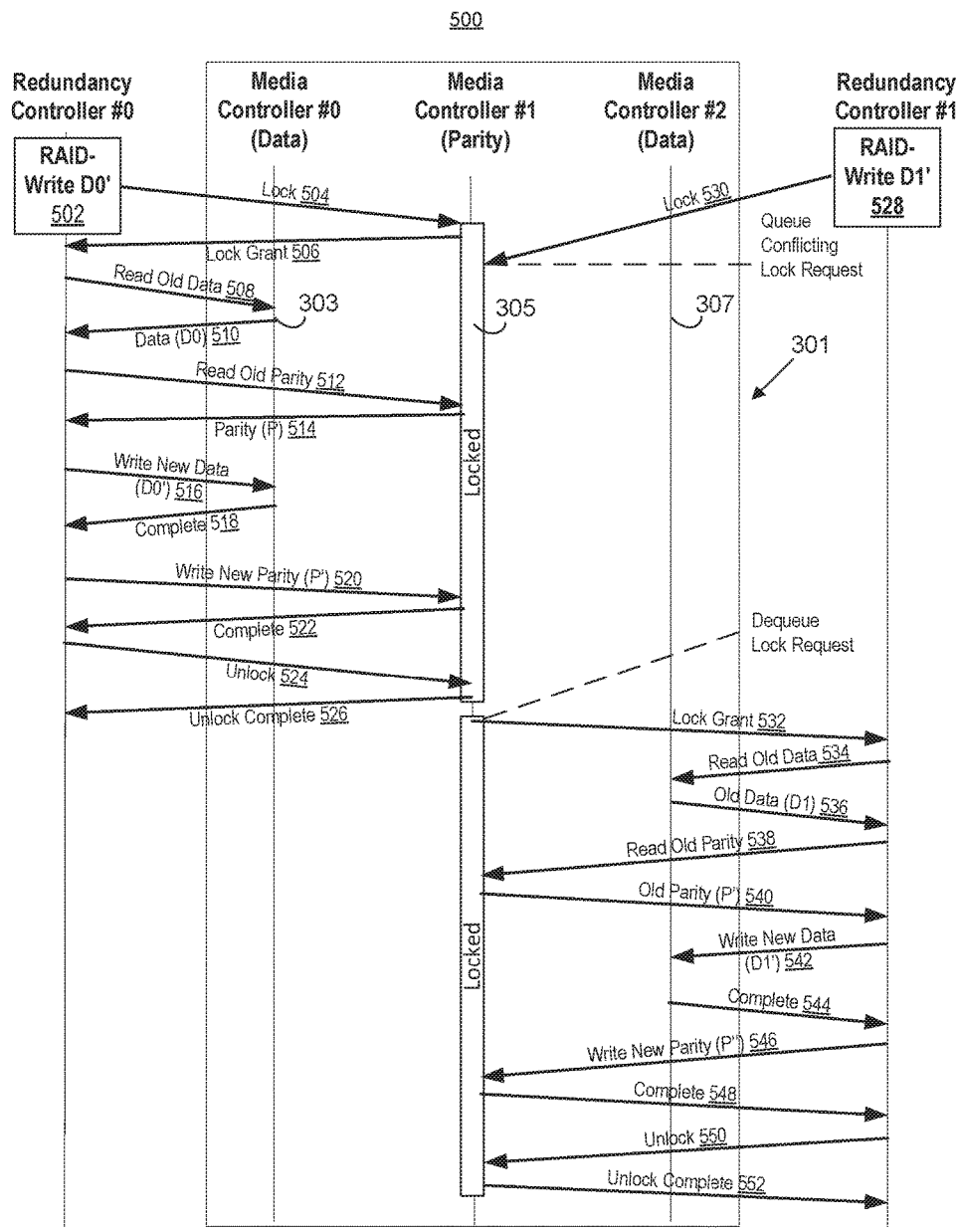
FIG. 5 shows a bounce diagram of a method to serialize concurrent write sequences by multiple redundancy controllers to fault tolerant memory, according to an example of the present disclosure.

FIG. 5 shows a bounce diagram of a method 500 to serialize concurrent write sequences by multiple redundancy controllers to fault tolerant memory, according to an example of the present disclosure. In this example, redundancy controller #0 and redundancy controller #1 may consult media controller #1, which hosts the parity cacheline, to acquire a lock for the stripe 301 prior to initiating an otherwise non-atomic RAID write sequence.

In block 502, the redundancy controller #0 receives a command to write data D0' to the first data memory module 303 in stripe 301. To perform the write sequence 502, the redundancy controller #0 may first request a lock from media controller #1, which hosts the parity cacheline, as shown in arc 504.

Since there is no single point of serialization with concurrent redundancy controllers #0 and #1, a point of serialization may be created at media controller #1 of the parity memory module 305. The point of serialization may be created at media controller #1 because any sequence that modifies the stripe 301 must communicate with memory module 305, because it is the memory module hosting the parity cacheline for the stripe 301. As a common resource accessed by both redundancy controllers #0 and #1 when accessing stripe 301, the media controller #1 of memory module 305 becomes the point of serialization for stripe 301.

According to an example, the lock may be an active queue inside the media controller #1. The active queue may include a stripe-specific flag or bit that indicates whether the stripe 301 is currently is locked. That is, the media controller of the parity memory module may (i) keep track of all pending lock requests for a stripe, grant the lock requests one at a time so that each requester gets a turn in sequence to hold the lock for that stripe and (ii) perform this independently for unrelated stripes. In this regard, any subsequent lock requests from other redundancy controllers to the locked stripe are in conflict and may be added to a conflict queue for later granting when the current lock is released. As an example, each media controller may implement a first in, first out (FIFO), conflict queue for each cacheline address, or a similar algorithm to ensure that each sequence eventually acquires the stripe-lock and makes forward progress. Media controllers may associate locks with cacheline addresses, since multiple stripes storing their parity cachelines on the same memory module must store the locks at different cacheline addresses to keep them distinct. Media controllers can thus manage locks for stripes, without requiring any detailed knowledge of the layout of the stripes.

In arc 506, media controller #1 has determined that the stripe 301 is not locked and grants a lock to redundancy controller #0. In response to acquiring the lock, the redundancy controller #0 may read the old data from the first data memory module 303 and receive the old data D0 from the media controller #0, as shown in arcs 508 and 510. The redundancy controller #0 then reads the old parity from the parity memory module 305 and receives the old parity P from the media controller #1, as shown in arcs 512 and 514. At this point, the redundancy controller #0 may write the new data D0' to the first data memory module 303 and in return receive a write completion message from the media controller #0, as shown in arcs 516 and 518. Next the redundancy controller #0 may calculate the new parity P. Finally, the redundancy controller #0 may write the new parity P' to the parity memory module 305 and in return receive a write completion message from the media controller #1, as shown in arcs 520 and 522. After these primitives have been completed by the redundancy controller #0, the redundancy controller #0 may release the lock in the media controller #1 and in return receive an unlock completion message, as shown in arcs 524 and 526.

In this example, the redundancy controller #1 may concurrently issue a sequence to write data D1' to the second data memory module 307 in stripe 301, as shown in block 528. The redundancy controller #1 may first request a lock from media controller #1, which hosts the parity cacheline, as shown in arc 530. However, the media controller #1 has determined that the stripe 301 is locked by redundancy controller #0. Therefore, the lock request by redundancy controller #1 may be placed into the conflict queue. The lock request may be removed from the conflict queue after the lock has been released by redundancy controller #0 as shown in arcs 524 and 526. Accordingly, once the media controller #1 has determined that the stripe 301 is not locked it may grant the lock to redundancy controller #1, as shown in arc 532.

In response to acquiring the lock, the redundancy controller #1 may read the old data from the second data memory module 307 and receive the old data D1 from the media controller #2, as shown in arcs 534 and 536. The redundancy controller #1 may then read the old parity from the parity memory module 305 and receive the old parity P', which is the same parity written by the redundancy controller #0 in arc 520 above, from the media controller #1, as shown in arcs 538 and 540. At this point, the redundancy controller #1 may write the new data D1' to the second data memory module 307 and in return receive a write completion message from the media controller #2, as shown in arcs 542 and 544. Next the redundancy controller #1 may calculate the new parity P″. Finally, the redundancy controller #1 may write the new parity P″ to the parity memory module 305 and in return receive a write completion message from the media controller #1, as shown in arcs 546 and 548. After these primitives have been completed by the redundancy controller #1, the redundancy controller #1 may release the lock in the media controller #1 and in return receive an unlock completion message, as shown in arcs 550 and 552.

The parity in this example may be calculated as:

$$P = D0\char`\^D1 \quad (1)$$

$$P' = D0'\char`\^D1 \text{ (after write } D0') \quad (2)$$

$$P'' = D0'\char`\^D1' \text{ (after write } D1') \quad (3)$$

Equation (1) may be rewritten as (4) D1=D0 ˆ P and substituted into equation (2) to arrive at (5) P′=D0′ˆ D0 ˆ P. As a result, the new parity P′ may always be computed by reading the old data (D0), reading the old parity (P), and performing an XOR function on these values with the new data (D′). Similarly, equation (2) may be rewritten as (6) D0′=D1 ˆ P′ and substituted into equation (3) to arrive at (7) P″=D1′ˆD1 ˆ P′. Therefore, the parity is consistent with the data after the two concurrent write sequences by multiple redundancy controllers in the example of FIG. 5.

Figure 6:
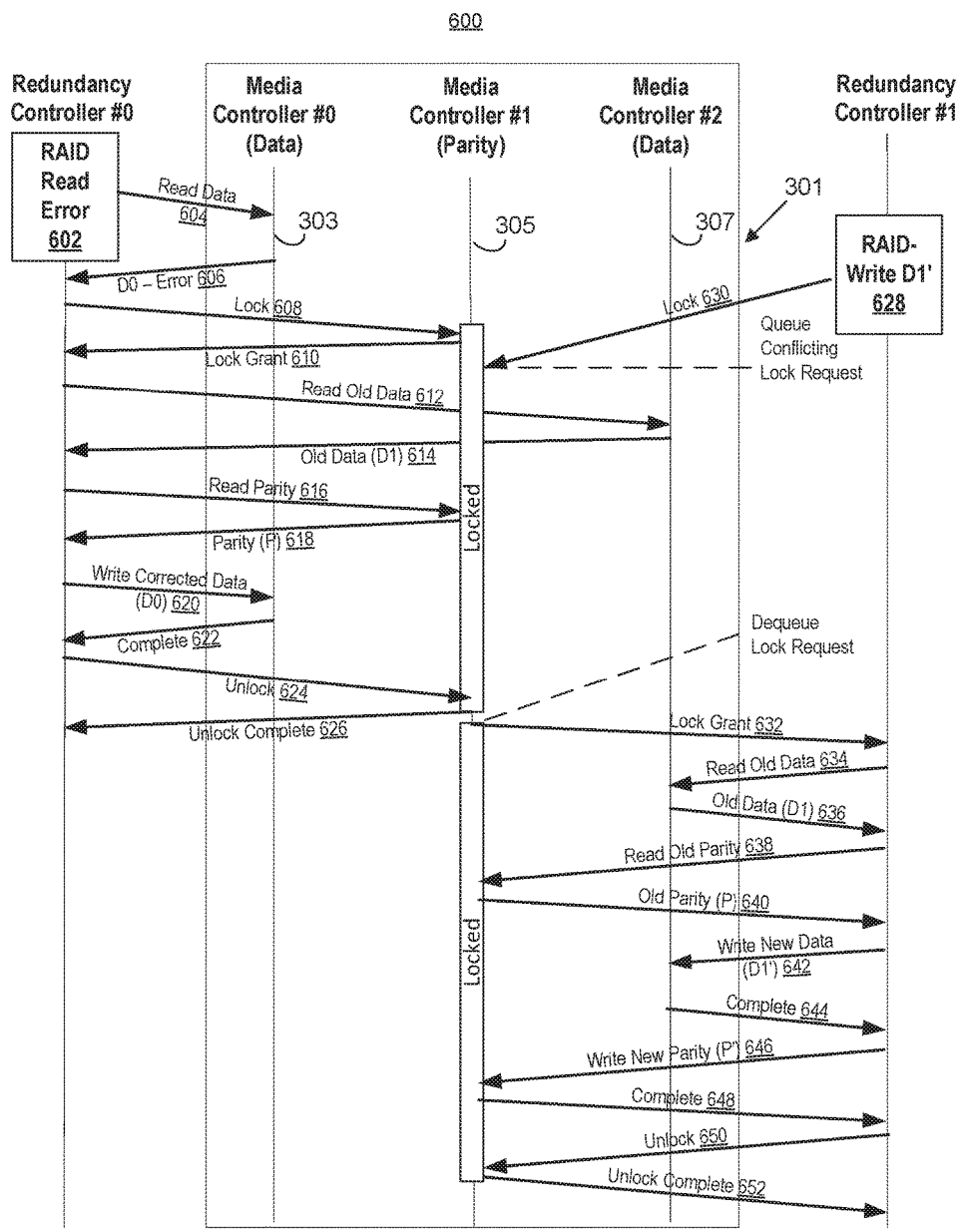
FIG. 6 shows a bounce diagram of a method to serialize a write sequence after a read error correction sequence by multiple redundancy controllers to fault tolerant memory, according to an example of the present disclosure.

FIG. 6 shows a bounce diagram of a method 600 to serialize a write sequence after a read error correction sequence by multiple redundancy controllers to fault tolerant memory, according to an example of the present disclosure. Block 602 shows the primitives that may be involved during a read error correction sequence according to an example.

As shown in arc 604, the redundancy controller #0 may attempt to read data from the first data memory module 303 of the stripe 301. However, the media controller #0 of the first data memory module 303 has returned an error message for data D0, as shown in arc 606. In this situation, the redundancy controller #0 may try to correct the read error by RAID-reconstructing data D0. To perform the error correction sequence, the redundancy controller #0 may first request a lock from media controller #1, which hosts the parity cacheline, as shown in arc 608.

In arc 610, the media controller #1 has determined that the stripe 301 is not locked and grants a lock to redundancy controller #0. Accordingly, redundancy controller #0 may read old data from the second data memory module 307 and receive the old data D1 from the media controller #2, as shown in arcs 612 and 614. The redundancy controller #0 may then read the parity from the parity memory module 305 and receive the parity P the from the media controller #1, as shown in arcs 616 and 618. The redundancy controller #0 may then calculate the corrected data D0. The redundancy controller #0 may write the corrected data D0 (i.e., reconstructed data D0) to the data memory module 303 and in return receive a write completion message from the media controller #0, as shown in arcs 620 and 622. According to an example, the corrected data D0 may be reconstructed by performing an XOR function on the parity P received from the media controller #1 and the data D1 received from the media controller #2. Once the read error correction sequence has been completed, the redundancy controller #0 may release the lock from the stripe 301 and in return receive an unlock completion message from the media controller #1, as shown in arcs 624 and 626.

In this example, the redundancy controller #1 concurrently issues a sequence to write data D1′ to the second data memory module 307 in stripe 301, as shown in block 628.

The redundancy controller #1 may first request a lock from media controller #1, which hosts the parity cacheline, as shown in arc 630. However, the media controller #1 has determined that the stripe 301 is locked by redundancy controller #0. Therefore, the lock request by redundancy controller #1 may be placed into a conflict queue. The lock request may be removed from the conflict queue after the lock has been released by redundancy controller #0 as shown in arc 626. Accordingly, once the media controller #1 has determined that the stripe 301 is not locked it may grant the lock to redundancy controller #1, as shown in arc 632.

In response to acquiring the lock, the redundancy controller #1 may read the old data from the second data memory module 307 and receive the old data D1 from the media controller #2, as shown in arcs 634 and 636. The redundancy controller #1 may then read the old parity from the parity memory module 305 and receive the old parity P from the media controller #1, as shown in arcs 638 and 640. At this point, the redundancy controller #1 may write the new data D1′ to the second data memory module 307 and in return receive a write completion message from the media controller #2, as shown in arcs 642 and 644. Next the redundancy controller #1 may calculate a new parity P′. Finally, the redundancy controller #1 may write the new parity P′ to the parity memory module 305 and in return receive a write completion message from the media controller #1, as shown in arcs 646 and 648. After these primitives have been completed by the redundancy controller #1, the redundancy controller #1 may release the lock in the media controller #1 and in return receive an unlock completion message, as shown in arcs 650 and 652.

The parity in this example may be calculated as:

$$P = D0\char`\^D1 \quad (1)$$

$$P' = D0\char`\^D1' \text{ (after } D1' \text{ Write)} \quad (2)$$

Equation (1) may be rewritten as (3) D0=Pˆ D1. Therefore, when a read error is observed on data D0, D0 may be regenerated by reading D1, reading P, and performing an XOR function on the returned values. Accordingly, the parity is consistent with the data after the concurrent read error correction sequence and the write sequence by the multiple redundancy controllers in the example of FIG. 6.

Figure 7:
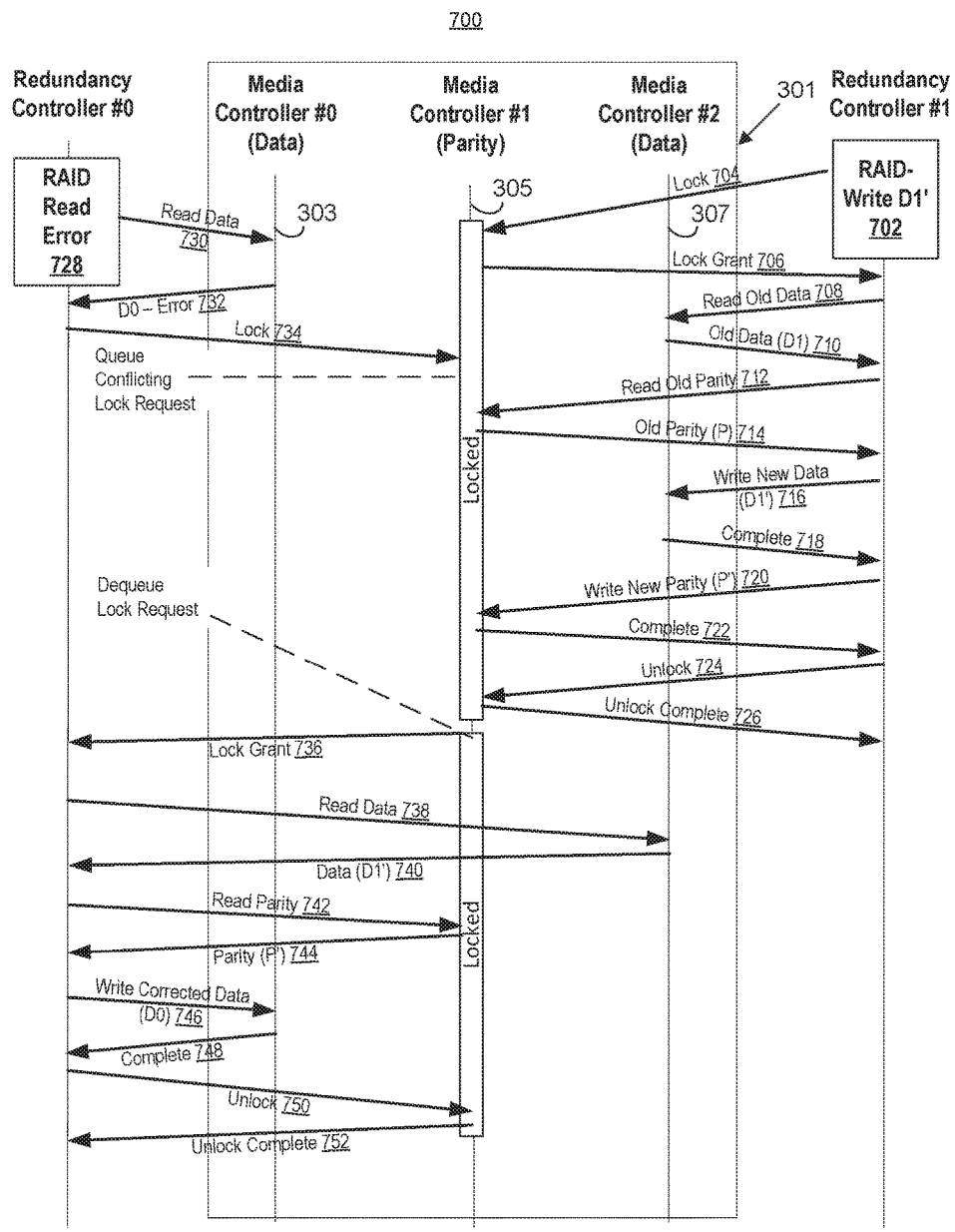
FIG. 7 shows a bounce diagram of a method to serialize read error correction sequence after a write sequence by multiple redundancy controllers to fault tolerant memory, according to an example of the present disclosure.

FIG. 7 shows a bounce diagram of a method 700 to serialize read error correction sequence after a write sequence by multiple servers to fault tolerant memory, according to an example of the present disclosure. Method 700 is similar to method 600 discussed above, except that the redundancy controller #1 acquires a lock from the media controller #1 prior to the redundancy controller #0 in this example.

As shown in block 702, the redundancy controller #1 may issue a sequence to write data D1′ to the second data memory module 307 in stripe 301. The redundancy controller #1 may first request a lock from media controller #1, which hosts the parity cacheline, as shown in arc 704. In block 706, the media controller #1 has determined that the stripe 301 is not locked and grants a lock to redundancy controller #1.

In response to acquiring the lock, the redundancy controller #1 may read the old data from the second data memory module 307 and receive the old data D1 from the media controller #2, as shown in arcs 708 and 710. The redundancy controller #1 may then read the old parity from the parity memory module 305 and receive the old parity P from the media controller #1, as shown in arcs 712 and 714. At this point, the redundancy controller #1 may write the new data D1′ to the second data memory module 307 and in return receive a write completion message from the media controller #2, as shown in arcs 716 and 718. Next the redundancy controller #1 may calculate a new parity P'. Finally, the redundancy controller #1 may write the new parity P' to the parity memory module 305 and in return receive a write completion message from the media controller #1, as shown in arcs 720 and 722. After these primitives have been completed by the redundancy controller #1, the redundancy controller #1 may release the lock in the media controller #1 and in return receive an unlock completion message, as shown in arcs 724 and 726.

As shown in block 728, the redundancy controller #0 may encounter a read error while attempting to access data D0 from the first data memory module 303. As shown in arc 730, the redundancy controller #0 may attempt to read data from the first data memory module 303 of the stripe 301. However, the media controller #0 of the first data memory module 303 may return an error message for data D0, as shown in arc 732. In this situation, the redundancy controller #0 may try to correct the read error by RAID-reconstructing data D0. To perform the error correction sequence, the redundancy controller #0 may first request a lock from media controller #1, which hosts the parity cacheline, as shown in arc 734.

However, the media controller #1 may determine that the stripe 301 is locked by redundancy controller #1. Therefore, the lock request by redundancy controller #0 may be placed into a conflict queue. The lock request may be removed from the conflict queue after the lock has been released by redundancy controller #1 as shown in arcs 724 and 726. Accordingly, once the media controller #1 has determined that the stripe 301 is not locked it may grant the lock to redundancy controller #0, as shown in arc 736.

In response to acquiring the lock, the redundancy controller #0 may read data from the second data memory module 307 and receive the data D1' from the media controller #2, as shown in arcs 738 and 740. The redundancy controller #0 may then read the parity from the parity memory module 305 and receive the parity P' the from the media controller #1, as shown in arcs 742 and 744. The redundancy controller #0 may calculate the corrected data D0, and then write corrected data D0 (i.e., reconstructed data D0) to the data memory module 303 and in return receive a write completion message from the media controller #0, as shown in arcs 746 and 748. According to an example, the corrected data D0 may be reconstructed by performing an XOR function on the parity P' received from the media controller #1 and the data D1' received from the media controller #2. Once the read error correction sequence has been completed, the redundancy controller #0 may release the lock from the stripe 301 and in return receive an unlock completion message from the media controller #1, as shown in arcs 750 and 752.

The parity in this example may be calculated as:

$$P=D0\char`\^D1 \quad (1)$$

$$P'=D0\char`\^D1' \text{ (after } D1' \text{ Write)} \quad (2)$$

Equation (2) may be rewritten as (3) D0=P' ^ D1. Therefore, when a read error is observed on data D0, D0 may be regenerated by reading D1', reading P', and performing an XOR function on the returned values. Accordingly, the parity is consistent with the data after the concurrent write sequence and the read error correction sequence by the multiple redundancy controllers in the example of FIG. 7.

With reference to FIG. 5 through FIG. 7, the order of primitives shown represents one possible ordering in a critical sequence. Other orderings are also applicable in the context of this invention. For example, the read-old-data primitive 508 and the read-old-parity primitive 512 may be swapped with no change in the result of the critical sequence. Similarly, the write-new-data primitive 516 and the write-new-parity primitive 520 may be swapped.

Also, other types of primitives are applicable in the context of this invention. For example, the performance of a critical sequence can be improved by combining primitives. For example, referring to FIG. 5, the lock primitive 504 and the read-old-parity primitive 512 may be combined into a single read-and-lock primitive. Similarly, the write-new-parity primitive 520 and the unlock primitive 524 may be combined into a single write-and-unlock primitive. Finally, the read-old-data primitive 508 and the write-new-data primitive 516 may be combined into a single swap-data primitive that reads and returns the old data D0, then writes the new data D0'. These optimizations reduce the number of serialized primitives in critical sequence 502 from six to three.

Figure 8:
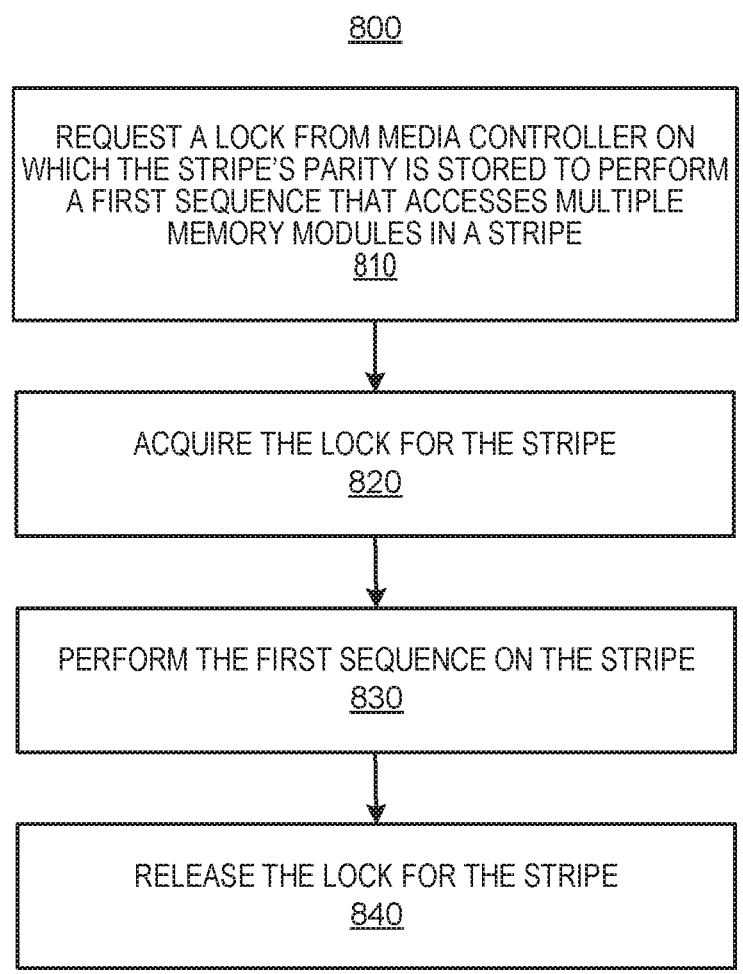
FIG. 8 shows a flow diagram of a method used by each redundancy controller to serialize concurrent accesses by multiple redundancy controllers to fault tolerant memory, according to an example of the present disclosure.

With reference to FIG. 8, there is shown a flow diagram of a method 800 used by multiple redundancy controllers to serialize concurrent accesses by multiple redundancy controllers to fault tolerant memory, according to an example of the present disclosure.

In block 810, the stripe locking module 112 of a first redundancy controller, for instance, may request a lock from the media controller on which the stripe's parity is stored to perform a first sequence that accesses multiple memory modules in a stripe. A stripe may include data stored in at least one data memory module and parity stored in at least one parity module. As discussed above, since there is typically no single point of serialization for multiple redundancy controllers that access a single stripe, a point of serialization may be created at the parity media controller. The point of serialization may be created at the parity media controller because any sequence that modifies the stripe has to access the parity.

In block 820, the stripe locking module 112, for instance, may acquire the lock for the stripe. The lock may provide the first redundancy controller with exclusive access to the stripe. For instance, the lock prevents a second redundancy controller from concurrently performing a second sequence that accesses multiple memory modules in the stripe during the locked sequence. The method for acquiring the lock is discussed further below with reference to FIG. 9.

In block 830, the read/write module 114 may perform the first sequence on the stripe. The first sequence may include a sequence that would be hazardous if not atomic, such as one that modifies memory in the stripe, or accesses multiple cachelines within the stripe. A read sequence not requiring error correction, however, is not hazardous because it only accesses a single memory module and so is inherently atomic, and it does not modify the stored value.

In block 840, the stripe locking module 112, for instance, may release the lock for the stripe. In one example, the lock may be removed once the first redundancy controller has completed the first sequence that modifies the multiple memory modules in the stripe.

Figure 9:
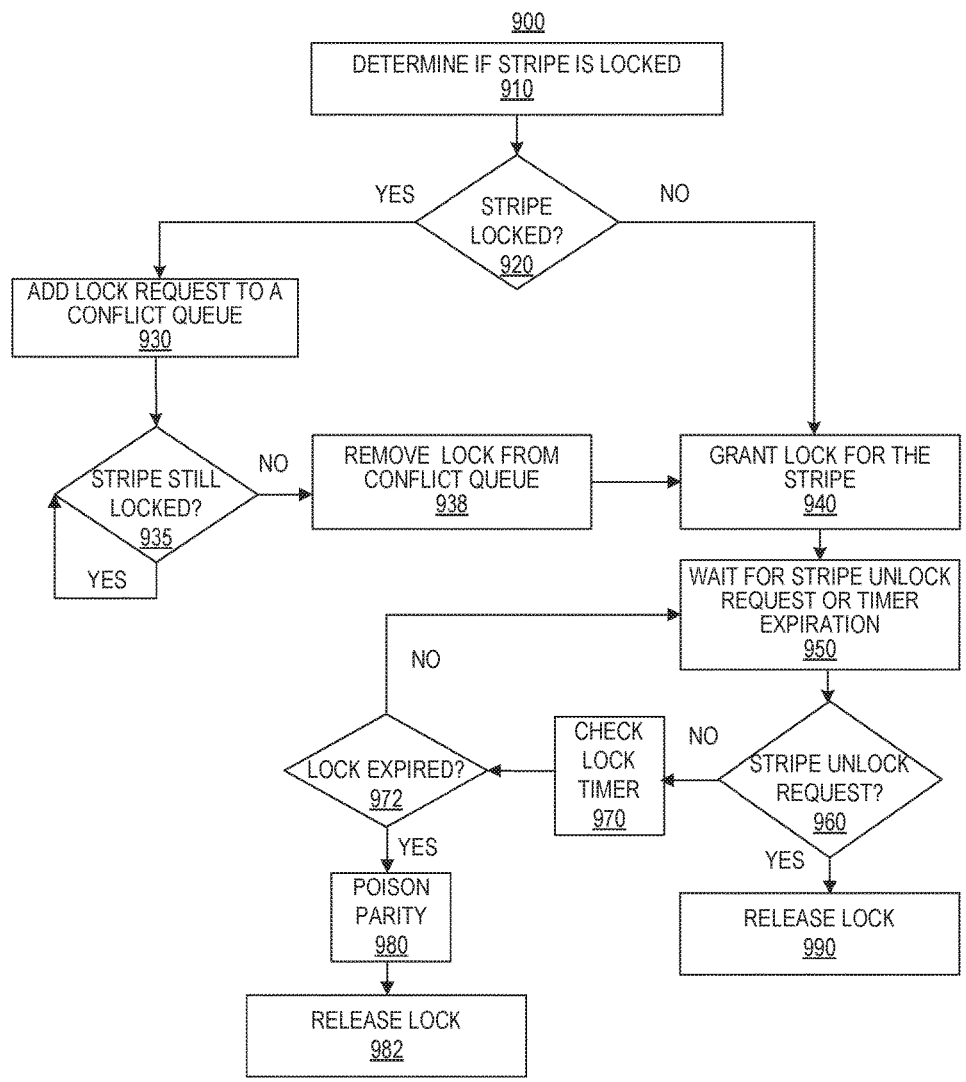
FIG. 9 shows a flow diagram of a method used by each media controller to acquire and release a lock for the stripe on behalf of a requesting redundancy controller, according to an example of the present disclosure.

With reference to FIG. 9, there is shown a flow diagram of a method 900 used by each media controller to acquire and release a lock for the stripe on behalf of a requesting redundancy controller, according to an example of the present disclosure.

In block 910, a new or queued lock request from a redundancy controller may be processed by the media controller to determine if a stripe is locked. If it is determined that the stripe is currently locked at block 920, the media controller may add the lock request to a stripe-specific conflict queue as shown in block 930. The queued lock request will remain queued at block 935 until the stripe is unlocked. After the stripe is unlocked, the lock request may be removed from the conflict queue 938. Accordingly, the lock request may be granted the lock when the current lock is released, as shown in block 940 as discussed further below.

If it is determined that the stripe is not locked at block 920, the media controller may immediately grant a lock for the stripe, as shown in block 940. At this point, the media controller may wait to receive a corresponding stripe unlock request or a timer expiration, as shown in block 950. In block 960, the media controller determines whether a stripe unlock request has been received.

In response to receiving a stripe unlock request corresponding to the locked stripe, the media controller may release the lock, as shown in block 990. On the other hand, when no corresponding stripe unlock request has been received, the media controller may check a lock timer to determine whether the duration of the lock has exceeded a predetermined time threshold, and if so, infer that the lock must be held by a redundancy controller that has failed, as shown in block 970. If the lock is determined to be expired at block 972, the corresponding parity cacheline is poisoned or flagged as invalid as shown in block 980. Accordingly, the lock is released as shown in block 982 and the poisoned parity of the stripe may subsequently be reconstructed by a redundancy controller using an error correction sequence. Alternatively, if the lock is determined not to be expired at block 972, the media controller may wait to receive a stripe unlock request corresponding to the locked stripe or a timer expiration, as shown in block 950.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A method to serialize concurrent accesses by multiple redundancy controllers to fault tolerant memory, the method comprising:
   requesting, by a first redundancy controller, a lock from a parity media controller to perform a first sequence that accesses multiple memory modules in a stripe
   acquiring the lock for the stripe;
   performing the first sequence on the stripe; and
   releasing the lock for the stripe,
   wherein acquiring the lock for the stripe comprises:
      determining from a stripe-specific flag in the parity media controller whether the stripe is locked or unlocked; and
      in response to the stripe being currently locked, adding the lock request to a conflict queue of the parity media controller for later grant of the lock when the current lock is released, and
   in response to the stripe being unlocked, acquiring the lock for the stripe; and
   wherein releasing the lock for the stripe comprises:
      identifying that a duration of the lock has exceeded a predetermined time threshold;
      removing the lock for the stripe;
      flagging the stripe's parity cacheline as invalid.

2. The method of claim 1, wherein acquiring the lock for the stripe comprises:
   providing the first redundancy controller exclusive access to the stripe, wherein the exclusive access prevents a second redundancy controller from concurrently performing a second sequence that accesses multiple memory modules in the stripe during the lock.

3. The method of claim 1, wherein releasing the lock for the stripe comprises unlocking the stripe in response to the first redundancy controller completing the first sequence that accesses multiple memory modules in the stripe.

4. The method of claim 1, wherein the stripe includes data stored in at least one data memory modules and parity stored in at least one parity memory module.

5. The method of claim 1, wherein the first redundancy controller comprises a server.

6. A computing device to serialize concurrent accesses by multiple redundancy controllers to fault tolerant memory, comprising:
   a hardware redundancy controller to:
      access a media controller that hosts a parity cacheline in a stripe prior to performing a sequence that accesses multiple memory modules in the stripe; and
      obtain a lock for the stripe from the media controller, wherein to obtain the lock for the stripe, the media controller is to:
      determine from a stripe-specific flag in the media controller whether the stripe is locked or unlocked; and
      in response to the stripe being currently locked, add the lock request to a conflict queue for later granting of the lock when the current lock is released, and
      in response to the stripe being unlocked, obtain the lock for the stripe; and
   wherein the media controller is to:
      identify that a duration of the lock has exceeded a predetermined time thershold;
      release the lock for the stripe; and
      flag the stripe's parity as invalid.

7. The computing device of claim 6, wherein the hardware redundancy controller is to release the lock for the stripe in response to completion of the sequence that accesses multiple memory modules in the stripe.

8. The computing device of claim 6 further comprising the media controller comprising the conflict queue.

9. A system to serialize concurrent accesses by multiple redundancy controllers to fault tolerant memory, comprising:
   a plurality of servers comprising a plurality of redundancy controllers, each of the redundancy controllers being dedicated to one of the plurality of servers;
   a plurality of memory modules each including a media controller and a memory, wherein the memory modules are connected to the plurality of redundancy controllers through a memory fabric,
   wherein each of the redundancy controllers is to:
      determine that a first sequence accesses multiple memory modules in a stripe;
      acquire a lock for the stripe from a parity media controller to perform the first sequence;
      perform the first sequence on the stripe; and
      release the lock for the stripe;
   wherein to release the lock for the stripe, the media controller is to:

identify that a duration of the lock has exceeded a predetermined time thershold;

release the lock for the stripe; and flag the stripe's parity cacheline as invalid.

10. The system of claim 9, wherein to acquire the lock for the stripe, the media controller is to:

determine from a stripe-specific flag in the parity media controller whether the stripe is locked or unlocked;

add the lock request to a conflict queue for later grant of the lock in response to the stripe being locked; and acquire the lock for the stripe in response to the stripe being unlocked.

11. The system of claim 10, wherein the media controller comprises the conflict queue.

12. The system of claim 11, wherein the conflict queue comprises a first in first out (FIFO) queue.

13. The system of claim 9, wherein to release the lock for the stripe, a redundancy controller is to unlock the stripe in response to completing the first locked sequence.

14. The system of claim 9, wherein a redundancy controller is to rebuild a stripe containing a parity cacheline flagged as invalid by performing a locked stripe rebuild sequence.

\* \* \* \* \*